United States Patent

Kearney et al.

Patent Number: 5,366,627
Date of Patent: Nov. 22, 1994

[54] ENCLOSED THOROUGH WASH FILTER PRESS

[75] Inventors: William P. Kearney, Kingston; George T. Quigley, Cottekill, both of N.Y.

[73] Assignee: Stavo Industries, Inc., Kingston, N.Y.

[21] Appl. No.: 95,800

[22] Filed: Jul. 22, 1993

[51] Int. Cl.⁵ ............................................ B01D 25/12
[52] U.S. Cl. .................... 210/224; 210/228; 210/248; 210/772
[58] Field of Search ............... 210/225, 230, 236–238, 210/224, 772, 248, 227, 228; 100/197

[56] References Cited

U.S. PATENT DOCUMENTS

| | | | |
|---|---|---|---|
| 842,484 | 1/1907 | Merrill | 210/225 |
| 4,737,285 | 4/1988 | Krulitsch et al. | 210/230 |

FOREIGN PATENT DOCUMENTS 3814397  11/1989  Germany .................... 210/225

*Primary Examiner*—Matthew O. Savage
*Attorney, Agent, or Firm*—Jacobson, Price, Holman & Stern

[57] ABSTRACT

A thorough wash operation of a process fluid is conducted within the confines of an enclosed housing. The housing includes four ports at one side of the housing for transmission of process fluids through a plurality of press frames so as to (1) separate solids from a principal liquid to recover a valuable commodity in the solid cakes formed from the principal liquid, or (2) remove contaminants from the principal liquid so as to recover a cleansed principal liquid, or (3) introduce a valuable commodity into a wash liquid from filter cakes formed from the principal liquid, which valuable commodity may subsequently be removed from the wash liquid. A drip pan hopper is removably secured to a bottom of the housing.

18 Claims, 4 Drawing Sheets

5,366,627

ENCLOSED THOROUGH WASH FILTER PRESS

FIELD OF THE INVENTION

The present invention involves the thorough wash filtration of a process fluid by an enclosed filter press so as to recover a volatile valuable commodity.

BACKGROUND OF THE INVENTION

Heretofore encapsulated disc filter constructions have included horizontal disc filters stacked to form a vertical column of filter discs and these filter discs, after being assembled, are lowered into an upstanding container in which they are subsequently mounted to form a high capacity filter construction. However, these stacks of filters may be of considerable height and represent a considerable load, therefore requiring being handled by overhead hoist mechanisms. Accordingly, the task of replacing disc filters is time consuming and requires the placement of a suitable hoist adjacent the container for the disc filters.

Although horizontal filter constructions including a filter assembly of a plurality of side-by-side upstanding filter discs heretofore have been provided, these previously known forms of filter constructions are without enclosures and may therefore not be utilized in conjunction with certain fluids from which drippings and vapors may escape.

Accordingly, a need exists for an encapsulated horizontal filter construction including filter frames or plates which may be individually supported from the encapsulating structure and readily renewed or replaced when desired.

U.S. Pat. No. 4,392,956 discloses a filter construction including an elongated horizontal filter construction which is of the fully encapsulated type and is constructed in a manner whereby the individual filter frames or plates may be readily removed and replaced, when desired. The filter construction includes an elongated upwardly opening tank having interconnected opposite side and end walls with a first stationary filter head mounted in one end of the tank and a second movable head mounted in the other end of the tank and adjustably shiftable toward and away from the first head for clampingly engaging a plurality of filter frames between the heads.

The interior of the tank includes opposite side filter plate or frame supporting bars extending longitudinally thereof adjacent the upper marginal edges of the side walls of the tank and the various filter frames or plates to be clamped between the heads include support lugs slidably engaged with and supported from the bars. The shiftable head is movable toward the stationary head whereby the filter frames and plates may be clamped between the heads and the stationary head includes a fluid inlet passage and a fluid outlet passage for admitting fluid to be filtered into the filter construction and allowing the flow of filtered fluid from the filter construction.

The tank includes a downwardly opening cover and a support frame which swingably supports the cover from the tank for forward and downward swinging positions to close the tank and upward and rearward swinging to move the cover to an open position. The cover is supported from the frame for limited oscillation about a horizontal longitudinal axis and the opposite end walls of the tank include trapezoidal-shaped upper extensions and the end walls of the cover include complementary similar shape and size downwardly opening recesses in which the extensions are received when the cover is closed. The upper marginal edges of the opposite side and end walls of the tank include a seal structure for forming a vapor-tight seal with the lower marginal edges of the side and end walls of the cover when the cover is in the closed position and the movable filter head is supported from the corresponding tank end wall through the utilization of a jack screw threaded through the tank end wall and which may therefore be manipulated from the exterior of the tank to increase or decrease the compression forces applied to the filter plates disposed between the heads within the tank.

A lower portion of the tank includes a drain opening. The support frame for the cover and the tank have a pair of fluid cylinders operably connected therebetween for swinging the cover between the open and closed positions thereof.

SUMMARY OF THE INVENTION

By the present invention, it is now possible to conduct a thorough wash operation of a process fluid within the confines of an enclosed housing. The housing includes four ports at one side of the housing for transmission of process fluids through a plurality of press frames so as to (1) separate solids from a principal liquid to recover a valuable commodity in the solid cakes formed from the principal liquid, or (2) remove contaminants from the principal liquid so as to recover a cleansed principal liquid, or (3) introduce a valuable commodity into a wash liquid from filter cakes formed from the principal liquid, which valuable commodity may subsequently be removed from the wash liquid.

Application of this invention is made, for example, to the treatment of volatile components, liquids which are easily vaporized or for high temperature liquid applications. A typical application is in the pharmaceutical industry, where blood fractions need to be separated from a principal liquid.

Solids suspended within a principal liquid are initially filtered by a filter media sheet which is rated to retain a particular size of particulate material. The filter media sheets are interposed between adjacent filter plates. A solids cake is formed in a hollowed frame of a filter plate. The filter plates are made up of three different configurations.

The principal liquid is introduced through a single port in a side of the housing. Two additional ports in the side of the housing are outlets for the principal liquid. A wash liquid is introduced through a fourth port of the housing. The wash liquid either forces impurities from the solids cake or by its interaction with the solids cake picks up quantities of a valuable commodity from the filter cakes which becomes suspended in the wash liquid and is later extracted from the wash liquid after the wash liquid is removed from the housing. The wash liquid exits the housing through the two ports used for the principal liquid for removal of filtered principal liquid.

Due to the potential explosive nature of either the principal liquid, the wash liquid or both, certain precautions have been taken to avoid the introduction of an electrical spark by the use of the housing. At least one of the wheels secured to a removable hopper, held in place by a vaportight seal against a sealing strip by a cam locking mechanism, are of a conductive material so that static electricity will not build up when the hopper is transported or moved across a floor to another operation site.

An air-operated control to elevate a hood of the housing allows an operator to simply push a button or turn a lever to raise or lower the hood of the housing. Air is inherently explosion-proof and therefore has advantageously been incorporated into the controls for the housing of the present invention.

In addition, an air-over-oil hydraulic closure system is used to maintain the integrity of the housing to prevent escape of fumes or liquids. This is an integral part of the closing system for compressing the movable filter head against a horizontally arranged row of vertically oriented filter plates. Alternately, an electro-mechanical closure system can be incorporated when air is impractical and the risk of explosion is not present. However, the seal between the interior and exterior of the housing is maintained.

Further, the drip pan hopper removable from the housing includes a drain with a butterfly valve for diverting any liquid which is able to migrate out of the compressed filter plate arrangement and collect in the hopper. The collected liquid would interfere with the quality of the collected valuable commodity when the filter cakes are the valuable commodity collected in the drip pan hopper. Since the filter cakes are dropped into the drip pan hopper from the filter plates, the drip pan hopper, after disengaging its vaportight seal to the housing, is removable from the bottom of the housing for conveyance to a location for the further processing of the filter cakes.

It is therefore an object of the present invention to provide an enclosed thorough wash filter press having four ports for entry of a principal liquid and removal of the filtered principal liquid followed by introduction of a wash liquid and removal of the wash liquid.

It is another object of the present invention to provide an enclosed thorough wash filter press having a removable drip pan hopper, locked in a vaportight position against a housing by a cam lock assembly.

It is yet another object of the present invention to provide an enclosed thorough wash filter press with a removable drip pan hopper having conductive wheels to prevent static electricity build-up.

It is yet another object of the present invention to provide an enclosed thorough wash filter press having an air-operated control system for raising and lowering a hood of a housing in which the thorough wash filter press is located.

It is still yet another object of the present invention to provide an air over oil closure system for compressing a movable filter head against a plurality of aligned filter plates without compromising a vaportight seal between an interior and an exterior of a housing.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
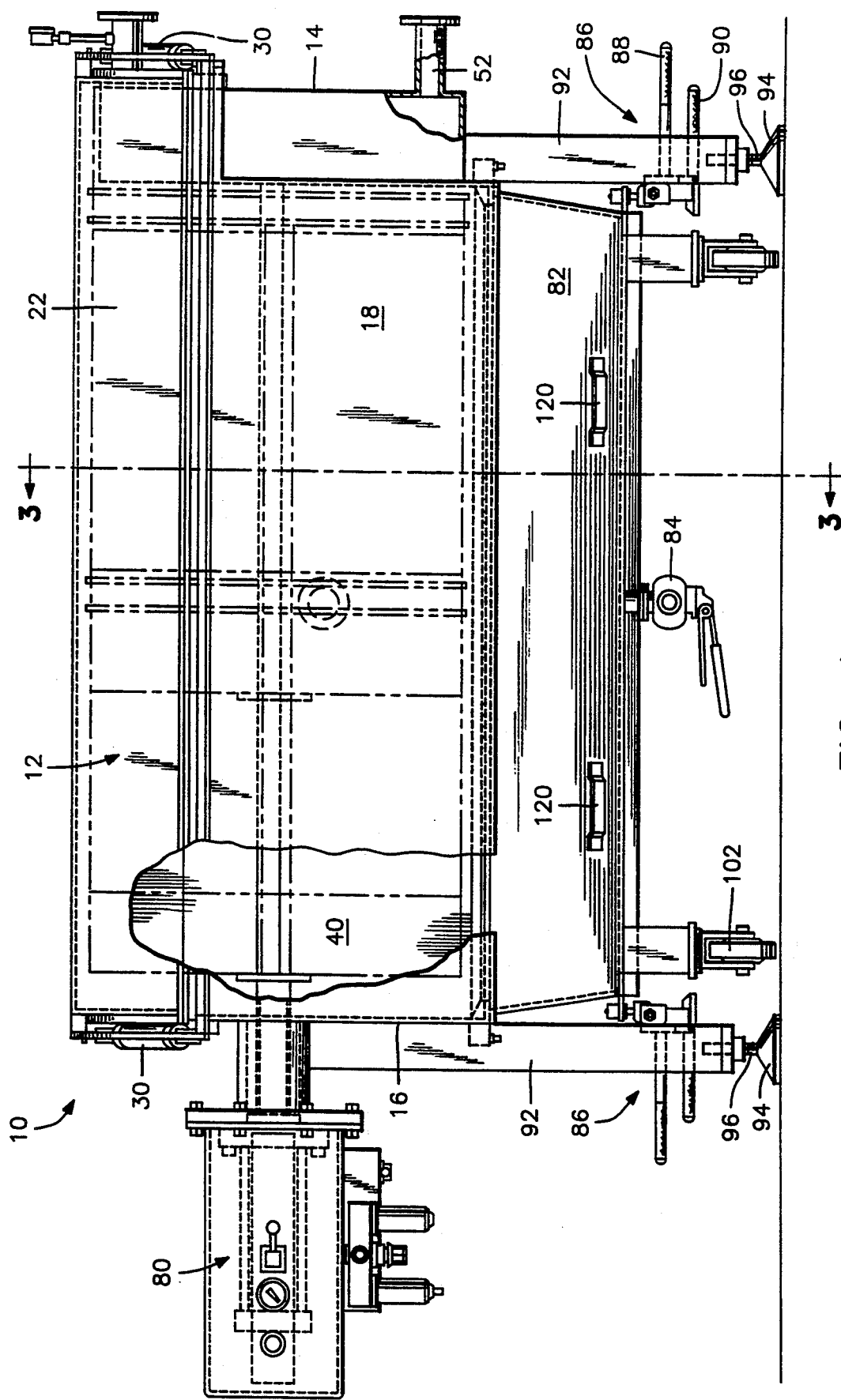
FIG. 1 is a front, partial cut-away view of an enclosed thorough wash filter press housing.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
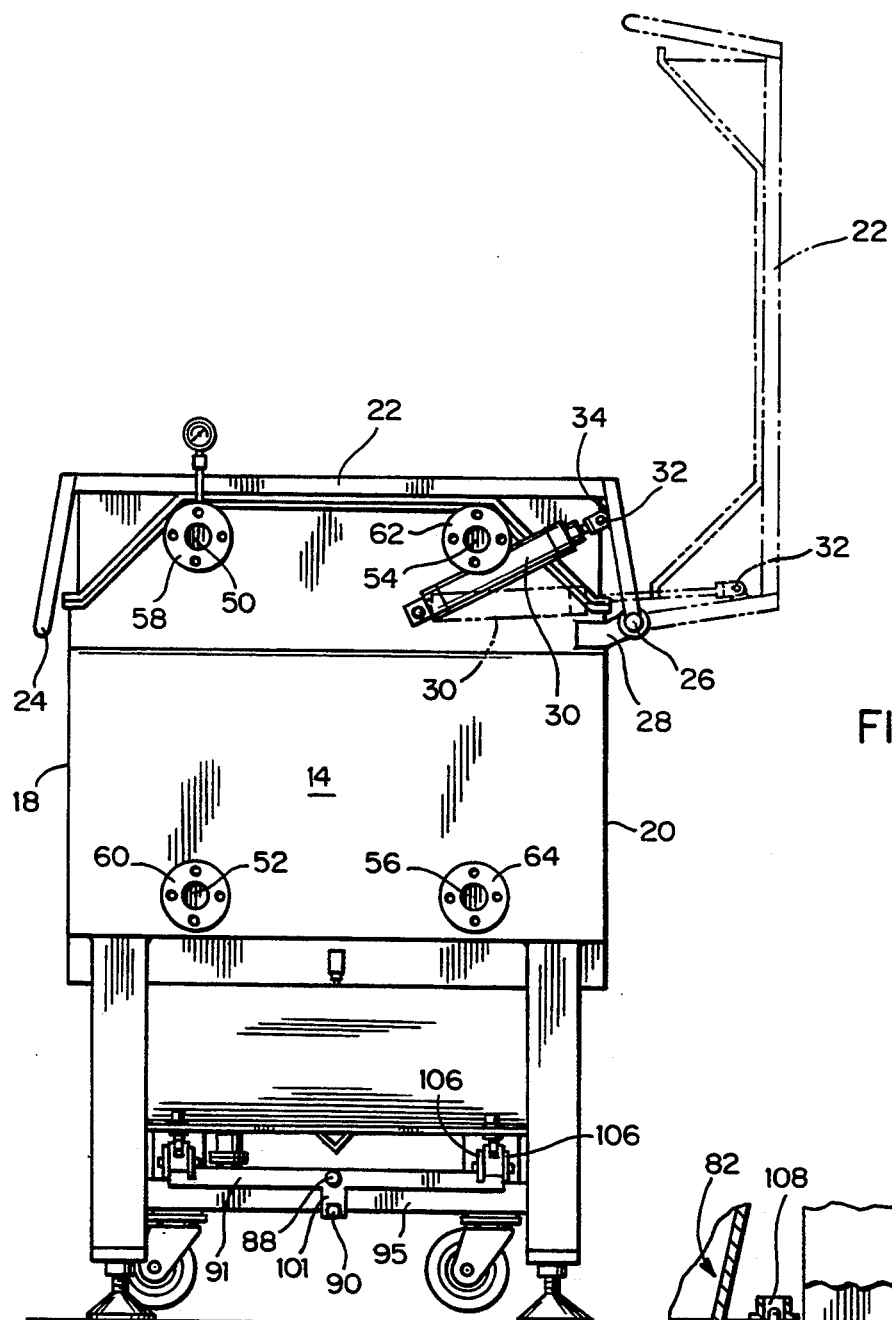
FIG. 2 is an end view of the enclosed thorough wash filter press housing.
Figure 4:
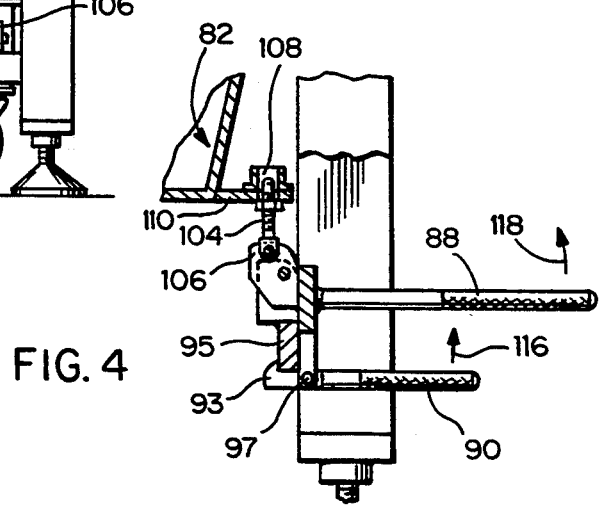
FIG. 4 illustrates an enlarged view of a cam mechanism for elevating a drip pan hopper.
Figure 3:
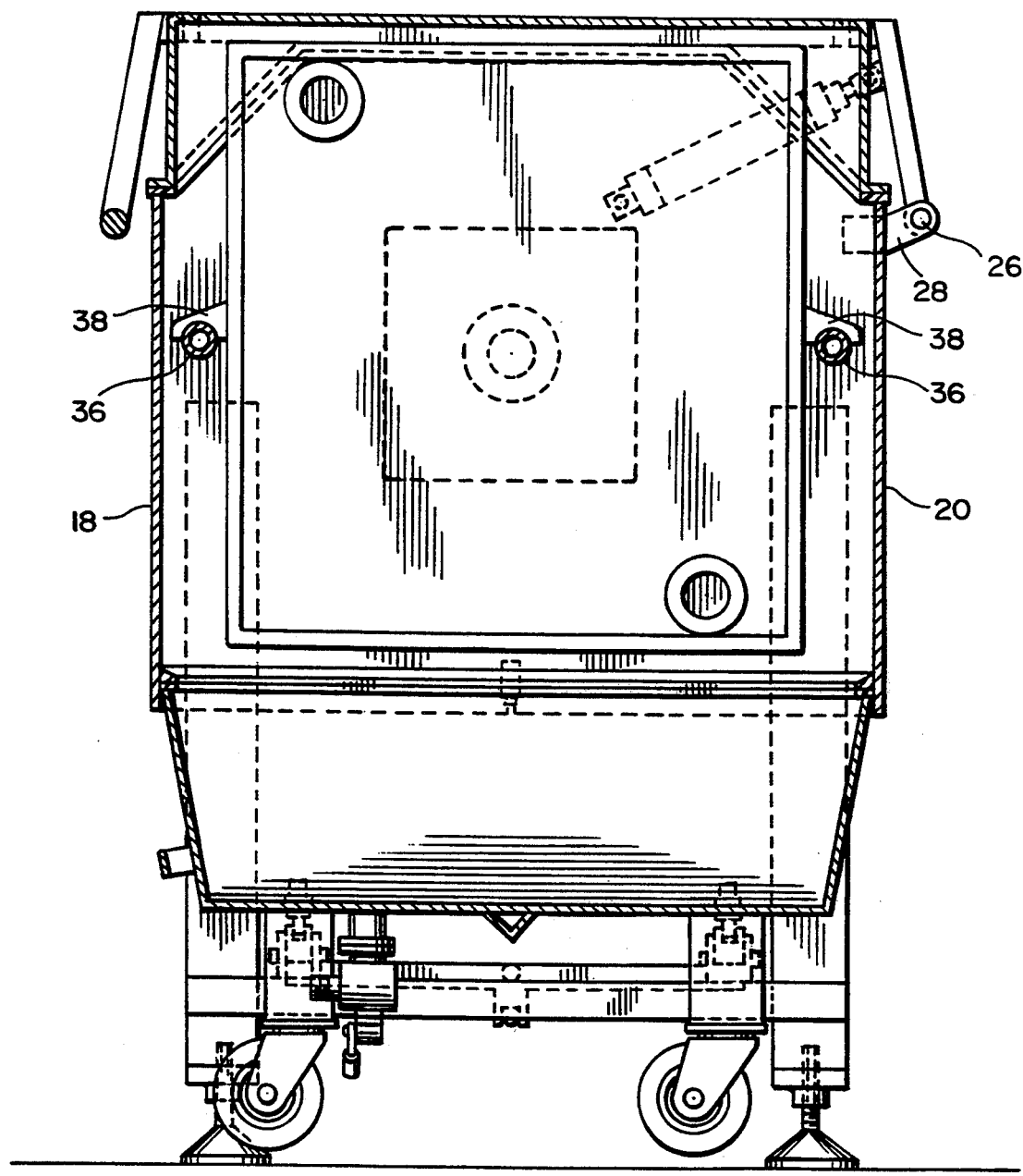
FIG. 3 is a sectional view taken along line 3—3 of FIG. 1.

With reference to the drawings, in general, and to FIGS. 1 through 3, in particular, an enclosed thorough wash filter press embodying the teachings of the subject invention is generally designated as 10. With reference to its orientation in FIG. 1, the enclosed thorough wash filter press includes a housing 12 having end wall 14 and opposite end wall 16. Between the two end walls 14, 16 are front wall 18 and rear wall 20. All liquid contact parts are made of 316L stainless steel with other parts made of 304 stainless steel.

At an upper surface of the housing is a pivotable hood 22 having front handle 24. The hood 22 is pivoted about pivot point 26 on bracket 28. Air operated means in the form of two piston cylinder assemblies 30 located on opposite sides of the hood and attached to side walls 14 and 16, are each pivotally mounted to the side walls and also each pivotally mounted to a flange 34 connected to the hood 22. The piston cylinder assemblies 30 include air assist and shock absorbing pistons for opening the hood 22 to the position shown in dotted lines in FIG. 2 so as to gain access into the interior of the housing 12 without the risk of explosion. When closed, the hood forms a vaportight seal with the housing.

Contained within the housing are two parallel horizontal lug support rods 36 which extend parallel to each other for supporting the two lugs 38 of each filter plate. A plurality of vertically oriented filter plates are hung on the rods 36 and are compressed by movable head 40 as shifted from the left-hand side of the housing in FIG. 1 towards the right-hand side of the housing in FIG. 1 and into engagement with the plurality of hanging filter plates so as to compress the filter plates. Between each of the adjacent filter plates is a filter media sheet 76 so as to prevent particles below a predetermined size contained in a liquid to pass between adjacent filter plates.

Figure 6:
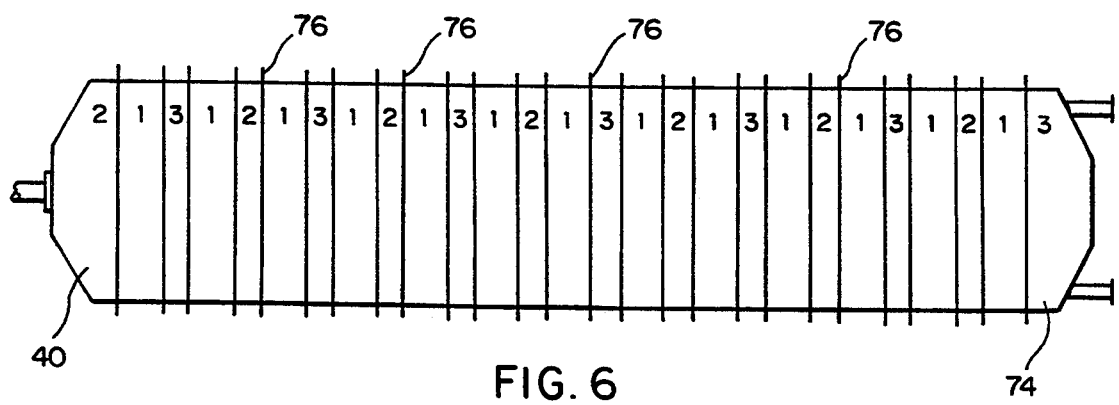
FIG. 6 schematically illustrates a location of various plates and frames in a filter press.
Figure 7A:
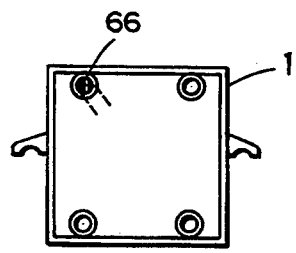
FIG. 7A is a detailed view of one type of filter plate.
Figure 7B:
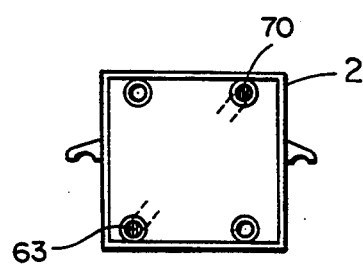
FIG. 7B illustrates a second type of filter plate.
Figure 7C:
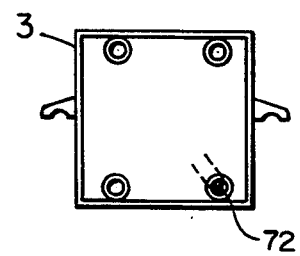
FIG. 7C illustrates a third type of filter plate.

The three types of filter plates used are shown in FIGS. 7A through 7C. In FIG. 6, an exemplary order of plates is illustrated with reference numeral 1 representing the plate configuration of FIG. 7A, reference numeral 2 representing the plate configuration of FIG. 7B and reference numeral 3 representing the filter plate configuration of FIG. 7C. The hatched circles in each of the filter plates shown in FIGS. 7A through 7C are indicative of through passageways. The remaining circled areas in the filter plates of FIGS. 7A through 7C do not allow passage of fluid.

In side wall 14 of the housing are located four ports 50, 52, 54, and 56 of approximately 1.5 inches diameter. Each of the ports 50, 52, 54 and 56 include a surrounding flange 58, 60, 62 and 64 each having four through-holes which are used to secure by bolts and nuts, feed or outlet pipes to the ports 50, 52, 54, 56. The location of the ports in side wall 14 corresponds to the location of the passageway 66 in filter plate 1, the passageways 68, 70 in filter plate 2 and the passageway 72 in filter plate 3.

It is understood that filter plate 1 is of a thicker width (approximately 2 inches) than filter plates 2 and 3 (approximately 0.5 inches thick) except for movable head 40 having the configuration of filter plate 2 and the fixed rear head 74 having the configuration of filter plate 3. As is known for the use of filter presses, filter plate 1 includes an opening extending between its opposed side walls for formation of a filter cake. Filter plate 1 is always compressed between filter plates 2 and 3 with a filter media 76 interposed between every adjacent filter plate, with only some of the filter media sheets 76 being labelled in FIG. 6. The internal construction of filter plates 2 and 3 includes a plurality of screens as is known in the filter press art.

In compression of the filter plates by movement of the movable head 40, an air/oil hydraulic control closure system 80 is used to compress the filter plates hung on the holding rods 36. This closure system insures the integrity of the housing so as to prevent potential escape of liquid and/or vapor. A contained hydraulic cylinder is included in the closure system which is rated at forty tons for a twelve-inch stroke length.

In the thorough wash process through filter plates 1, 2 and 3, a principal liquid introduced under pressure through port 50 will pass through passageway 66 in filter plate 1 and then proceed in a direction perpendicular to the direction of flow through passageway 66 by a channel extending from passageway 66 into the opening defined by filter plate 1 for formation of a filter cake. The principal liquid will then pass in opposite directions through interposed filter media sheets 76 on opposite sides of filter plate 1. The filter media sheets 76 allow liquid and particulate below a predetermined size to pass from filter plate 1. The oversized particulate will collect in filter plate 1 and form a filter cake.

The filtered principal liquid leaving filter plate 1 enters a filter plate 2, having passageways 68 and 70. The filtered principal liquid passes out through ports 52 and 54 for possible further processing of the principal fluid. During introduction of the principal liquid, the port 56 may be blocked to prevent passage of liquid from the housing 12.

In the instance where the formed filter cake is a valuable commodity, the filtered principal liquid may not be further treated. However, when the principal liquid is the valuable commodity, the principal liquid after passing through the aligned filter plates has had impurities removed by the formation of filter cakes so that the principal liquid may be recycled for future use.

By the thorough wash process where the filter cake is the valuable commodity, after passage of the principal liquid through the enclosed filter press, a wash liquid is introduced into port 56. The wash liquid is then introduced into filter plates 3, through passageway 72, and proceeds at first in a direction perpendicular to the direction of feed in through passageway 72 through a channel extending from passageway 72.

The wash liquid then proceeds parallel to the direction of feed of liquid through passageway 72 so as to pass through the formed filter cakes in filter plates 1 so as to either (1) remove impurities from the filter cakes in the case where the filter cakes are the valuable commodity, or (2) the wash liquid removes a valuable commodity from the formed filter cake and carries the valuable commodity, with the wash liquid, which exits from ports 52 and 54 for further processing of the wash liquid for separation of the valuable commodity from the wash liquid. A thorough wash filtering of liquids is therefore now possible with liquids which would normally pose a problem if thorough washed in an open air environment.

During filtration, any liquid seeping down to the lower edge of the filter media sheets 76 can drop into drip pan hopper 82. Drip pan hopper 82 is secured to the underside of the front wall 18, rear wall 20 and side walls 14, 16 of housing 12 by a vaportight seal. Any liquid gathered in the drip pan hopper may be drained from the drip pan hopper into a drainline through hopper drain 84 which includes a one and one-half inch butterfly valve.

The drip pan hopper 82 is removably secured to the underside of the housing by a cam lock assembly 86. The arms 88, 90 of the cam release mechanism protrude between the four legs 92 which support the housing by adjustable foot pads 94 mounted on a threaded shaft 96.

Figure 5:
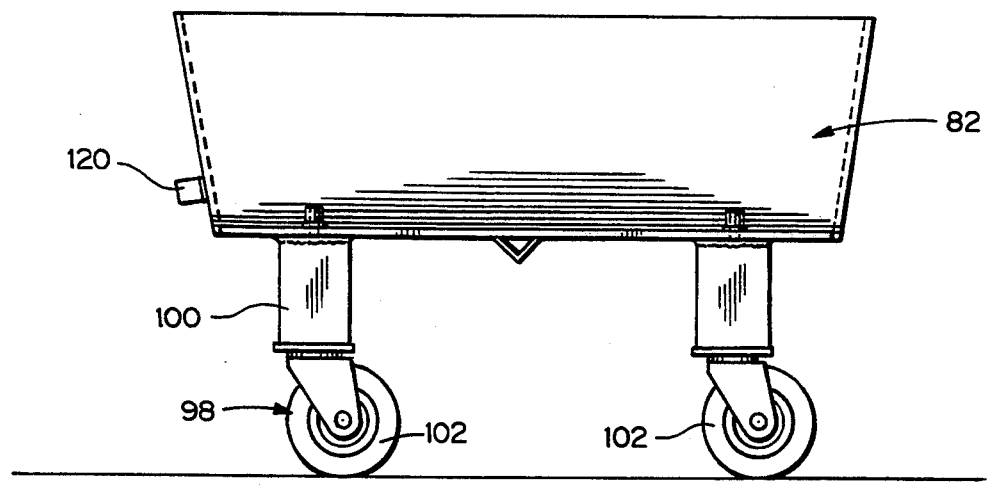
FIG. 5 illustrates a drip pan hopper.

The drip pan hopper 82 is supported on the floor, as shown in FIG. 5 by six-inch swivel casters 98 connected to a bottom of the drip pan hopper by support brackets 100. Of the four wheels 102 for the drip pan hopper, at least one is a conductive wheel so as to prevent build-up of static electricity which could result in initiation of a spark during movement of the drip pan hopper across a floor.

During the filtration process, the drip pan hopper 82 is supported in intimate, biased contact with the housing for a vaportight seal by a threaded pin 104 being pivotally mounted on a cam pivot lug 106 so as to engage in a cylindrical channel opening 108 of a support plate 110 connected to the bottom 112 of the drip pan hopper 82. Two cam pivot lugs are interconnected by crosspiece 91 to which handles 88, 90 are secured. Handle 90 grips a crosspiece 95 between legs 92 by hooked hose 93. Handle 90 is pivotally mounted by pin 97 on a projection 101 of crosspiece 91.

A nut 114 adjusts the height of threaded pin 104 to control the amount of entry of threaded pin 104 into channel 108 and thereby control the height of the drip pan hopper 82 with respect to the housing 12. Upon movement of the handles 88, 90 in the direction of arrows 116 and 118, the handle 90 is released from crosspiece 95 and the handles 88,90 are swung out of the way. The drip pan hopper is lowered so that the wheels 102, which are normally positioned above the ground as shown in FIG. 1, are lowered into contact with the ground as shown in FIG. 5. Handles 120 may then be pulled so as to move the hopper drip pan 82 out from underneath the housing 12.

The lowering and removal of the drip pan hopper are performed after the processing of the process liquids. The filter plates are separated and the filter cakes are removed from filter plates 1 so as to drop into the drip pan hopper. Upon lowering and removal of the drip pan hopper, the filter cakes can be further processed for recovery of a valuable commodity or discarded if the filter cakes do not have a further use.

Having described the invention, many modifications thereto will become apparent to those skilled in the art to which it pertains without deviation from the spirit of the invention as defined by the scope of the appended claims.

We claim:

1. A filter press comprising:
 a housing,
 a plurality of filter plates arranged in said housing for filtration of a principal liquid,
 port means in said housing for passage of a principal liquid and a wash liquid into said housing and through said plurality of filter plates and for removal of said principal liquid and said wash liquid after passage through said plurality of filter plates,
 a hood for sealing said housing, means for pivotally mounting said hood on said housing, and
 a drip pan hopper including means for removably securing said drip pan hopper to said housing.

2. A filter press according to claim 1, wherein said hood forms a vapor-tight seal with said housing.

3. A filter press according to claim 1, wherein said means for removably securing said drip pan hopper to said housing biases said drip pan hopper into a vapor-tight seal against said housing.

4. A filter press according to claim 3, wherein said means for removably securing said drip pan hopper to said housing includes a cam locking assembly for biasing said drip pan hopper against said housing.

5. A filter press according to claim 1, wherein said drip pan hopper includes wheels for moving said drip pan hopper away from said housing.

6. A filter press according to claim 5, wherein at least one of said wheels is electrically conductive.

7. A filter press according to claim 1, wherein said means for removably securing said drip pan hopper to said housing elevates said drip pan hopper from a floor when said drip pan hopper is secured to said housing.

8. A filter press according to claim 1, wherein a hydraulic control system is used to compress said plurality of filter plates in said housing.

9. A filter press according to claim 1, wherein said means for pivotally mounting said hood on said housing includes air operated means secured to said hood and said housing for movement of said hood while avoiding risk of an explosion induced by a spark.

10. A filter press comprising:
 a housing,
 a plurality of filter plates for filtration of a liquid,
 a hood for sealing said housing, means for pivotally mounting said hood on said housing, and
 a drip pan hopper including means for removably securing said drip pan hopper to said housing for conveying away filter cakes formed in said plurality of filter plates and dropped into said drip pan hopper.

11. A filter press according to claim 10, wherein said means for removably securing said drip pan hopper to said housing includes a cam locking assembly for biasing said drip pan hopper against said housing.

12. A filter press according to claim 11, wherein said cam locking assembly is mounted on legs of said hopper and said cam locking assembly engages said drip pan hopper to elevate said drip pan hopper from a floor and into engagement with said housing.

13. A filter press according to claim 10, wherein said hood forms a vapor-tight seal with said housing.

14. A filter press according to claim 10, wherein said drip pan hopper includes wheels for moving said drip pan hopper away from said housing.

15. A filter press according to claim 14, wherein at least one of said wheels is electrically conductive.

16. A filter press according to claim 10, wherein a hydraulic control system is used to compress said plurality of filter plates in said housing.

17. A filter press according to claim 10, wherein said means for pivotally mounting said hood on said housing includes air operated means secured to said hood and said housing for movement of said hood while avoiding risk of an explosion induced by a spark.

18. A filter press comprising:
 a housing,
 a plurality of filter plates arranged in said housing for filtration of a principal liquid,
 means including four ports in said housing for passage of a principal liquid into said housing through a first one of said four ports and passage of a wash liquid into said housing through a second one of said four ports and through said plurality of filter plates and for removal of said principal liquid and said wash liquid through a third and fourth one of said four ports after passage through said plurality of filter plates,
 a drip pan hopper including means for removably securing said drip pan hopper to said housing,
 a liquid drain in said hopper for allowing passage of liquid from said hopper, said liquid collecting in said hopper after having escaped from between said filter plates,
 a hood for sealing said housing, and means for pivotally mounting said hood on said housing.

* * * * *

UNITED STATES PATENT AND TRADEMARK OFFICE
CERTIFICATE OF CORRECTION

PATENT NO. : 5,366,627
DATED : November 22, 1994
INVENTOR(S) : KEARNEY, et al.

It is certified that error appears in the above-indentified patent and that said Letters Patent is hereby corrected as shown below:

On the title page, left column at [56] References Cited should include :

-

--References Cited

U.S. PATENT DOCUMENTS

|  |  |  | Class/Sub Class |  |
|---|---|---|---|---|
| 1,852,371 | 4/1932 | Raymond, et al. | 210 | 130 |
| 1,860,937 | 5/1932 | McCaskell | 210 | 230 |
| 3,272,296 | 9/1966 | Fredholm | 210 | 232 |
| 4,081,380 | 3/1978 | Johnson | 210 | 232 |
| 4,392,956 | 7/1983 | Vogel-- | 210 | 224 |

Signed and Sealed this

Twenty-first Day of March, 1995

Attest:

BRUCE LEHMAN

Attesting Officer        Commissioner of Patents and Trademarks